US007207114B2

(12) United States Patent
Rosu et al.

(10) Patent No.: US 7,207,114 B2
(45) Date of Patent: Apr. 24, 2007

(54) ROTARY KNIFE WITH IMPROVED DRIVE TRANSMISSION

(75) Inventors: Marinel Rosu, Strongsville, OH (US); Jeffrey A. Whited, Amherst, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 188 days.

(21) Appl. No.: 11/144,885

(22) Filed: Jun. 3, 2005

(65) Prior Publication Data

US 2006/0037200 A1 Feb. 23, 2006

Related U.S. Application Data

(60) Provisional application No. 60/602,840, filed on Aug. 19, 2004.

(51) Int. Cl.
*A22C 17/00* (2006.01)

(52) U.S. Cl. .......................... 30/276; 30/293; 452/134

(58) Field of Classification Search ................. 30/276, 30/286, 293, 282; 452/125, 132, 133, 134, 452/149
See application file for complete search history.

(56) References Cited

U.S. PATENT DOCUMENTS 4,170,063 A 10/1979 Bettcher
4,324,043 A * 4/1982 McCullough ................ 30/276
4,439,924 A 4/1984 Bettcher
4,494,311 A * 1/1985 McCullough ................ 30/276
4,509,261 A * 4/1985 Bettcher ...................... 30/276
4,516,323 A * 5/1985 Bettcher et al. ............. 30/276
4,637,140 A * 1/1987 Bettcher ...................... 30/276
4,854,046 A * 8/1989 Decker et al. ............. 452/149
4,894,915 A * 1/1990 Decker et al. ................ 30/276
5,025,559 A * 6/1991 McCullough ................ 30/276
5,230,154 A * 7/1993 Decker et al. ................ 30/276
6,694,649 B2 * 2/2004 Whited et al. ............. 303/276
6,751,872 B1 6/2004 Whited et al.
2003/0084576 A1 * 5/2003 Whited et al. ................ 30/276

* cited by examiner

*Primary Examiner*—M. Rachuba
(74) *Attorney, Agent, or Firm*—Tarolli, Sundheim, Covell & Tummino LLP

(57) ABSTRACT

A rotary knife with an improved drive transmission. The knife includes a tubular handle assembly, an annular blade, a blade housing, a pneumatic motor, and a drive transmission assembly. The transmission includes a drive or pinion gear, a drive shaft, and a connector assembly that inhibits axial movement of the pinion gear into the blade housing by the force of air pressure.

15 Claims, 8 Drawing Sheets

ROTARY KNIFE WITH IMPROVED DRIVE TRANSMISSION

CROSS-REFERENCE TO RELATED APPLICATION

This application claims priority from Provisional Application No. 60/602,840, filed on Aug. 19, 2004. Provisional Application No. 60/602,840 is incorporated in its entirety by reference herein.

FIELD OF THE INVENTION

The present invention concerns a rotary trimming knife for use in the meat industry and, more particularly, the present invention relates to a pneumatic rotary knife with an improved transmission that inhibits axial movement of a drive gear by the force of air pressure.

BACKGROUND OF THE INVENTION

U.S. Pat. No. 4,170,063 to Bettcher (herein "the '063 patent") discloses a rotary knife having a removable blade. The '063 patent is assigned to Bettcher Industries, the assignee of the present invention. The '063 patent discloses a hand knife having a ring-like rotary blade that is rotated by a motor in a handle that extends normal to an axis of rotation of the blade. The blade of the knife is rotatably supported in a housing that surrounds a part of the blade. The blade can be removed for sharpening or replacement of the blade. Other representative United States patents relating to rotary knives that are assigned to the assignee of the present invention are U.S. Pat. No. 4,439,924, U.S. Pat. No. 4,516, 323, and U.S. Pat. No. 4,509,261.

Pneumatic meat trimming knives having an air powered motor with a user-operated control valve for governing the flow of operating air to the motor are known. The pneumatic knives include rotating, or oscillating blades that are driven by air motors. Conventionally these tools' are connected to a source of high pressure air via a flexible conduit. Their operation is controlled by a user-actuated valve that is opened and closed to start and stop the drive motor.

SUMMARY OF THE INVENTION

The present invention concerns a rotary knife with an improved drive transmission that is operable from a source of high pressure air. The knife includes a tubular handle assembly, an annular blade, a blade housing, a pneumatic motor, and a drive transmission assembly. The annular blade includes a blade edge at a first axial end and gear teeth formed around a perimeter of a second axial end. The blade housing is coupled to the tubular handle assembly. The blade housing supports the annular blade for rotation about a central axis. The pneumatic motor is supported by the handle assembly for driving the blade. The transmission includes a drive or pinion gear, a drive shaft, and a connector assembly that inhibits axial movement of the pinion gear into the blade housing by the force of air pressure. The connector assembly is coupled to the pneumatic motor. The connector assembly includes first and second clamping members. The first clamping member has an inner surface of axially decreasing extent. The second clamping member has an exterior surface of axially decreasing extent that engages the inner surface of the first clamping member. The second clamping member also includes an inner clamping surface. Axial pressing of the second member into the first clamping member reduces the size of the clamping surface. The drive shaft is clamped in the clamping the surface of the connector assembly by axially pressing of the second clamping member into the first clamping member. The pinion gear is fixed to the drive shaft. The pinion gear meshes with the annular blade gear teeth to drive the annular blade upon rotation by the pneumatic motor assembly.

In one embodiment, the first clamping member is a connector having a first end connected to an output shaft of the pneumatic motor. A second end of the connector includes an inner conical surface. In one embodiment, the second clamping member is a collet having a conical exterior surface for engaging the conical interior surface of the connector. The collet includes an axial passage that defines the clamping surface. When the collet is axially pressed into the connector, the exterior conical surface of the collet engages the interior conical surface of the connector to reduce the size of the axial passage and clamp down on the pinion gear drive shaft.

In one embodiment, the second clamping member is axially pressed into the first clamping member by tightening of a nut having internal threads that engage external threads of the first clamping member. The drive shaft extends through a central opening in the nut and the second clamping member is pressed into the first clamping member by an interior surface of the nut that surrounds the central opening.

In a method of coupling a pinion gear to a rotary knife pneumatic motor, a drive shaft of the pinion gear is inserted into the opening in the second clamping member. The second clamping member is inserted to the first clamping member. The second clamping member is axially pressed into the first clamping member to reduce the size of the opening in the second clamping member. The second clamping member frictionally engages the drive shaft to couple the pinion gear to the rotary knife pneumatic motor.

Alternate exemplary embodiments of the invention are described with a degree of particularity in conjunction with the accompanying drawings.

BRIEF DESCRIPTION FOR THE DRAWINGS

DETAILED DESCRIPTION

Applicants have found that air that leaks into the front of pneumatic rotary knives can cause a drive or pinion gear to be forced into engagement with a blade housing cover plate 21. The contact of the pinion gear with the cover plate causes wear on the pinion gear and the cover plate and causes heat due to friction. This heat can be transferred into the rotary knife and can become uncomfortable for the operator.

Figure 1:
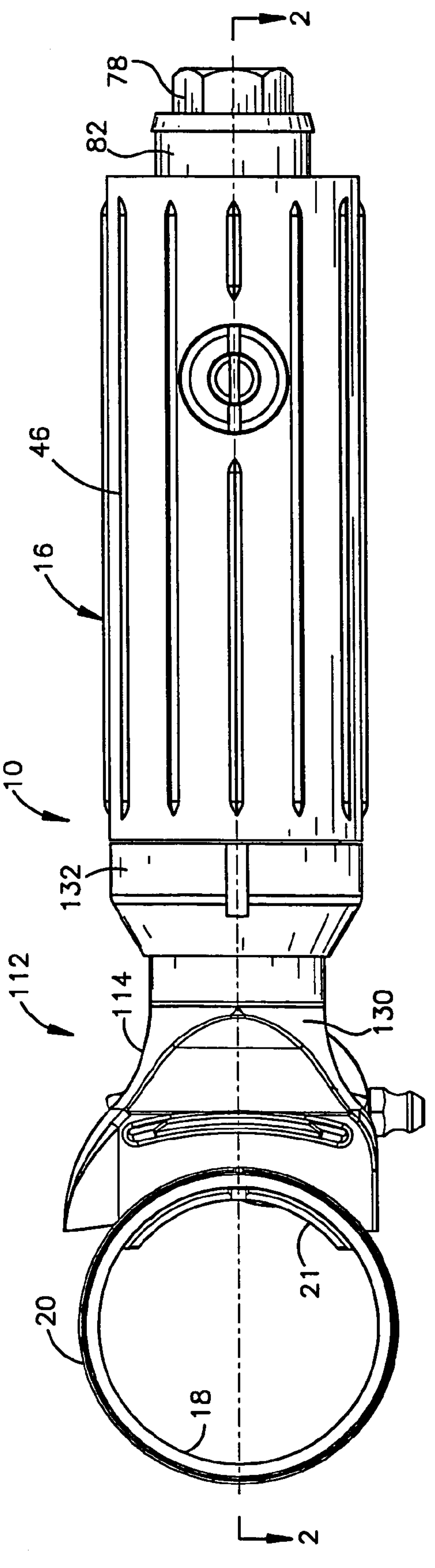
FIG. 1 is a top plan view of a pneumatic rotary knife.
Figure 2:
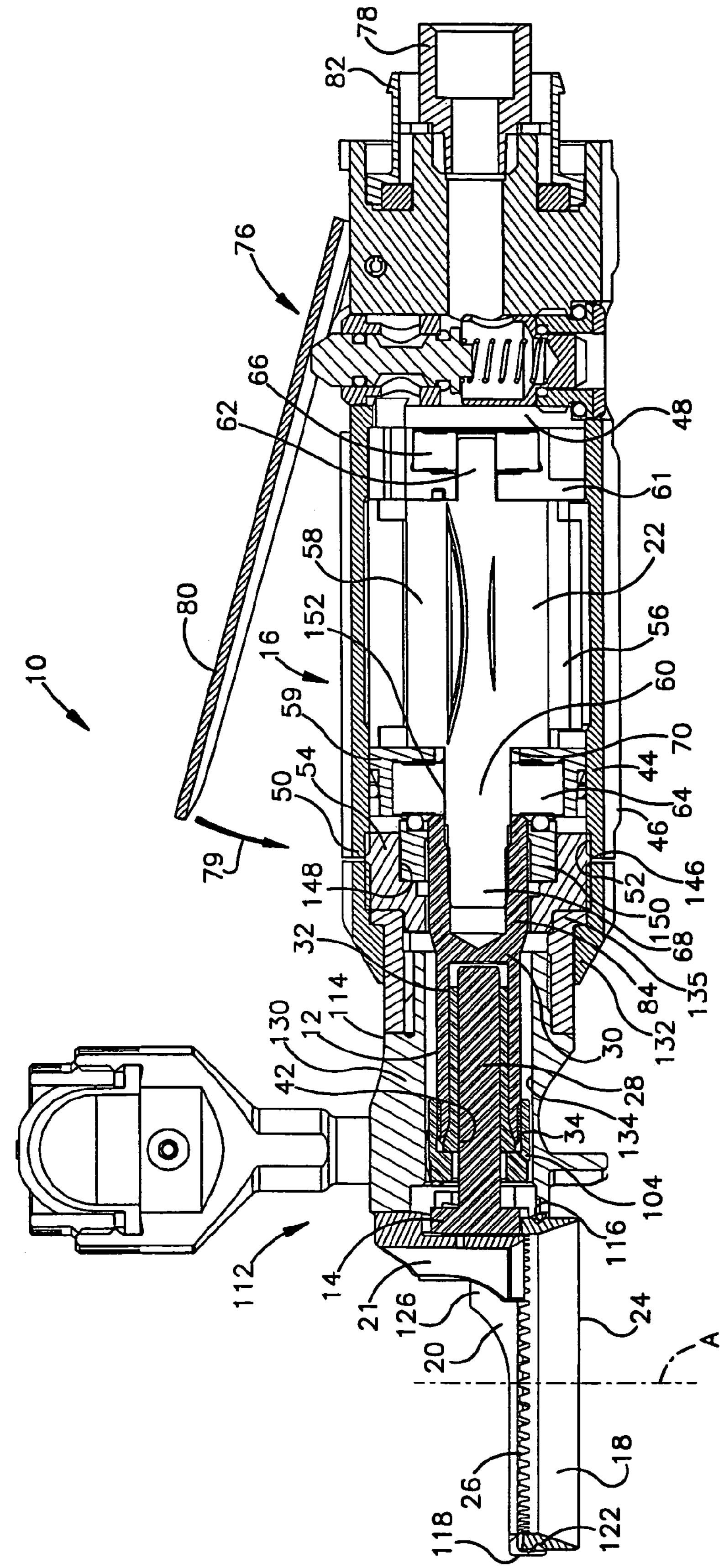
FIG. 2 is a sectional view taken along the plane indicated by lines 2—2 in FIG. 1.

The present invention is directed to an improved pneumatic rotary knife 10 with an improved transmission 12 that inhibits axial movement of a drive gear 14 by the force of air pressure. An example of one knife constructed in accordance with the present invention is illustrated in FIGS. 1 and 2. The knife 10 is illustrated as comprising a tubular handle assembly 16, an annular blade 18, a blade housing 20, a pneumatic motor 22, and the drive transmission assembly 12.

Figure 3:
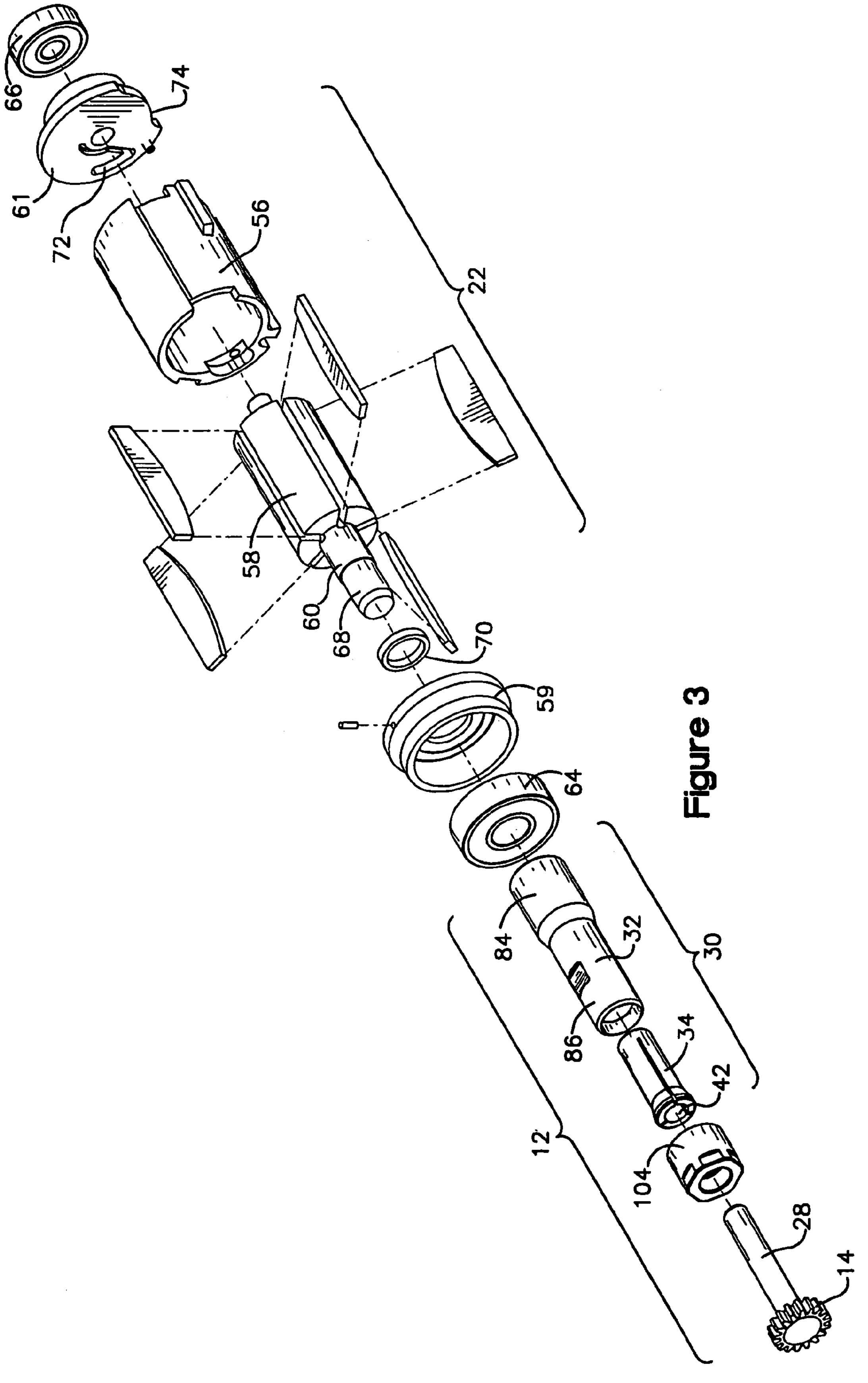
FIG. 3 is an exploded perspective view of a pneumatic motor and a drive transmission of the pneumatic rotary knife shown in FIG. 1.

Referring to FIG. 2, the annular blade 18 includes a blade edge 24 at a first axial end and gear teeth 26 formed around a perimeter of a second axial end. The blade housing 20 is coupled to the tubular handle assembly 16. The blade housing 20 supports the annular blade 18 for rotation about a central axis A. The pneumatic motor 22 is supported by the handle assembly 16 for driving the blade 18. Referring to FIG. 3, the transmission includes a drive or pinion gear 14, a drive shaft 28, and a connector assembly 30 that inhibits axial movement of the pinion gear into the blade housing 20 by the force of air pressure. The connector assembly is coupled to the pneumatic motor 22. The connector assembly includes first and second clamping members 32, 34. Referring to FIGS. 4–7, the illustrated first clamping member 32 has an inner surface 36 of axially decreasing extent in the direction of arrow 38. Referring to FIGS. 4 and 8–11, the illustrated second clamping member 34 has an exterior surface 40 of axially decreasing extent in the direction of arrow 38. The exterior surface 40 engages the inner surface 36 of the first clamping member. The second clamping member 34 also includes an inner clamping surface 42. Axial pressing of the second clamping member 34 into the first clamping member 32 reduces the size of the clamping surface 42. The drive shaft 28 is clamped in the clamping surface 42 of the connector assembly by axial pressing of the second clamping member 34 into the first clamping member 32. The pinion gear 14 is fixed to the drive shaft 28. The pinion gear 14 meshes with the annular blade gear teeth 26 to drive the annular blade 18 upon rotation by the pneumatic motor assembly 22.

Referring to FIGS. 1 and 2, the illustrated handle assembly 16 includes a tubular housing 44, a handle sleeve 46, and an end piece 48 that is fixed in the housing 42. The housing 42 is generally cylindrical while the sleeve 46 is irregularly shaped to allow the user to more easily grip the knife. An open end 50 of the tubular housing 44 includes internal threads 52 that accept a retainer 54. The retainer 54 secures the motor 22 in the handle assembly 16. The end piece 48 is formed by a generally circular port plate that defines an air inlet port, or passage and an exhaust port, or passage each communicating with the motor assembly. A wide variety of inlet port and outlet port arrangements are well known. The inlet and exhaust parts in the end piece 48 may be of any suitable or conventional construction and are therefore not described in further detail.

Referring to FIGS. 2 and 3, the illustrated pneumatic motor 22 comprises a cylindrical stator 56 fixed in the tubular housing and a rotor 58 disposed within the stator. A top plate 59 is secured to one end of the stator 56 and a bottom plate 61 is secured to an opposite end of the stator. The bottom plate 61 defines an inlet port 72 and an outlet port 74 of the stator 56. The inlet port and outlet port may be of any suitable or conventional arrangement and therefore are not described in further detail. Bearing assemblies 64, 66 are disposed in the top plate and the bottom plate respectively. The rotor 58 has a drive shaft 60 projecting from one end and a support shaft 62 projecting from the opposite end. The drive shaft 60 and support shaft 62 extend from the rotor through the top plate 59 and bottom plate 61 into the bearing assemblies 64, 66. The bearing assemblies 64,66 support the shafts 60, 62 respectively. The drive shaft 60 includes an externally threaded end portion 68. A spacer ring 70 maintains a space between the bearing assembly 64 and the rotor 58. The rotor and stator may be of any suitable or conventional construction and therefore are not described in further detail.

Referring to FIG. 2, a control valve arrangement 76 is disposed in the handle assembly behind the end piece 48. An inlet fitting 78 and an outlet vent 82 are coupled to the control valve arrangement. The control valve arrangement 76 selectively communicates air under pressure from the inlet fitting 78 to the rotor 58 via the inlet port 72 (FIG. 3). When a control valve handle 80 is in an open position (position of handle indicated by arrow 79 in FIG. 2) the motor assembly 16 is operated from the pressure source and drives the blade 18. The outlet port 74 delivers exhaust air from the motor assembly 16 to the vent 82. When a control valve handle 80 is in a closed position (position of handle shown in FIG. 2) the motor assembly 16 is not operated by the pressure source. A wide variety of control valve arrangements are known. The control valve arrangement may be of any suitable or conventional construction and therefore is not described in further detail.

The rotary knife 10 is connectable to a source via a flexible conduit (not illustrated) that permits the tool user to move about and manipulate the tool freely. The conduit may be of any conventional or suitable construction. For example, an assembly of flexible co-axial rubber hoses that are respectively detachably connected to the inlet fitting 78 and the vent 82 respectively. The vent hose is disposed loosely around the hose that communicates the source pressure to the knife 10.

Figure 5:
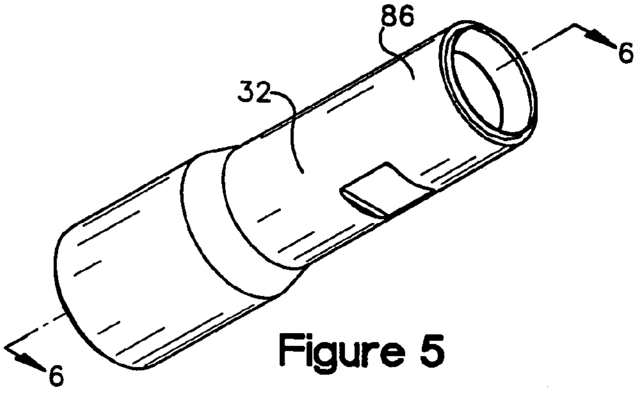
FIG. 5 is a perspective view of a connector.
Figure 6:
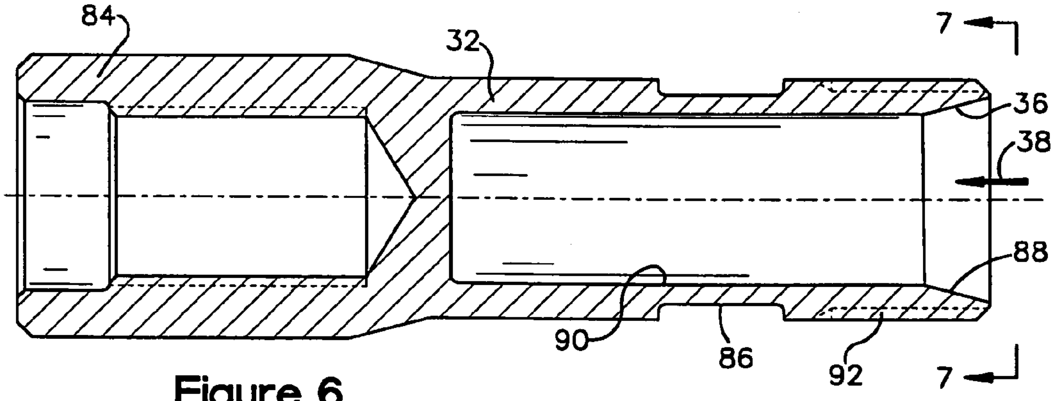
FIG. 6 is a sectional view taken along the plane indicated by lines 6—6 in FIG. 5.
Figure 7:
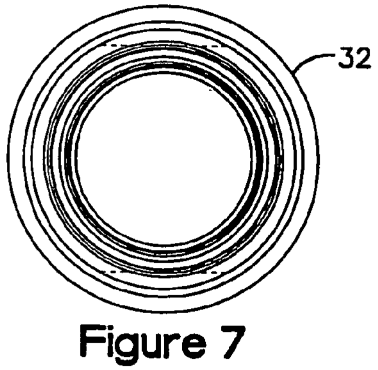
FIG. 7 is a view taken along the plane indicated by lines 7—7 in FIG. 6.
Figure 8:
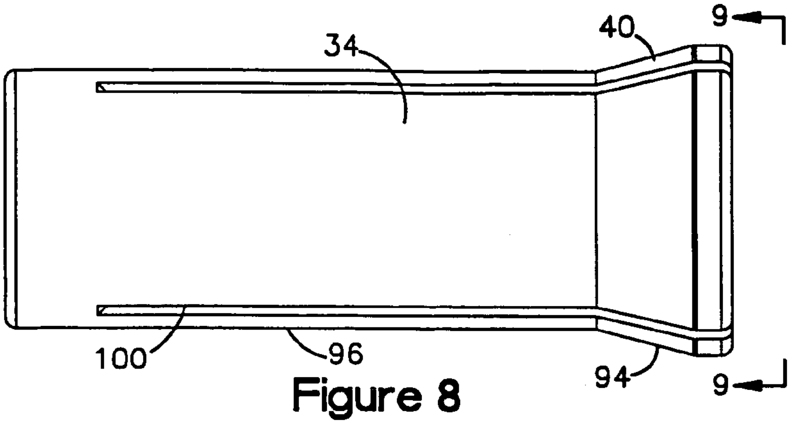
FIG. 8 is a side elevational view of a collet.
Figure 9:
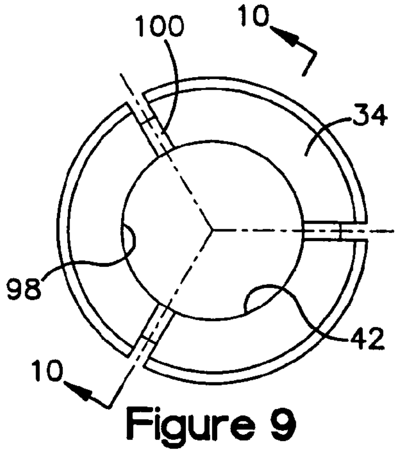
FIG. 9 is a view taken along the plane indicated by lines 9—9 in FIG. 8.
Figure 10:
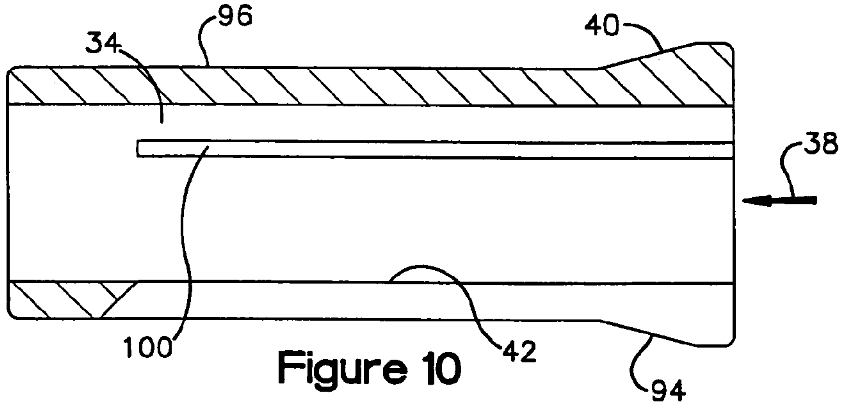
FIG. 10 is a sectional view taken along the plane indicted by lines 10—10 in FIG. 9.
Figure 11:
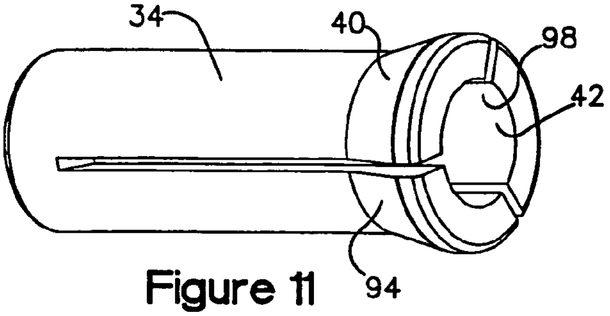
FIG. 11 is a perspective view of the collet illustrated in FIG. 8.
Figure 12:
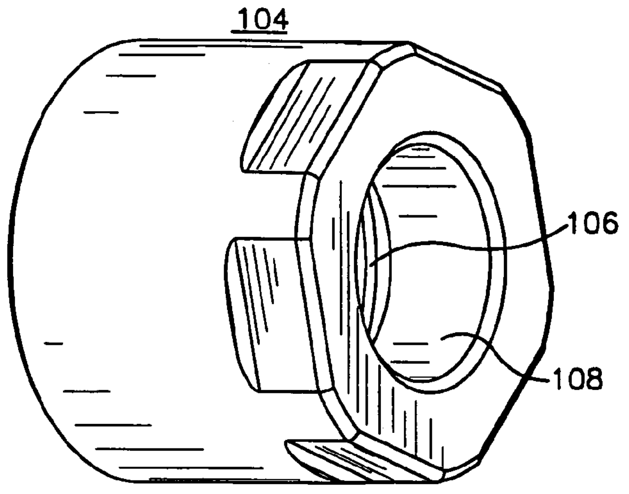
FIG. 12 is a perspective view of a nut.
Figure 13:
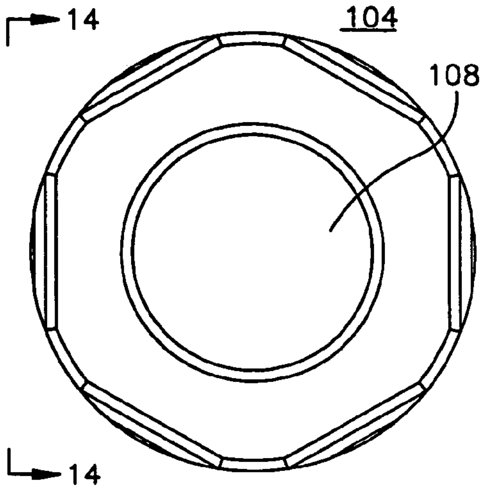
FIG. 13 is a top plan view of a nut.
Figure 14:
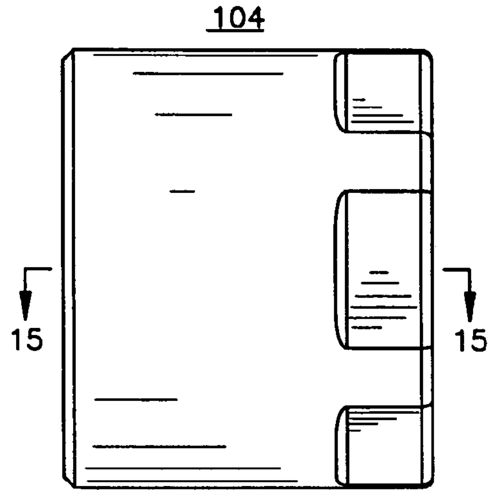
FIG. 14 is a view taken along the plane indicated by lines 14—14 in FIG. 13.
Figure 15:
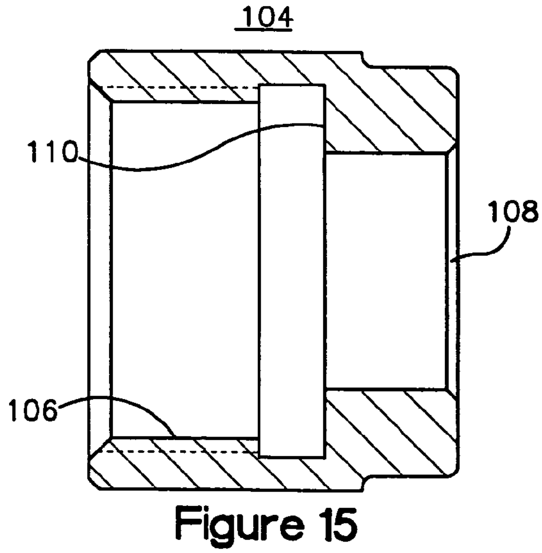
FIG. 15 is a sectional view taken along the plane indicated by lines 15—15 in FIG. 14.

Referring to the transmission 12 illustrated in FIG. 2, the first clamping member 32 is a connector having a first end 84 connected to the output shaft 60 of the pneumatic motor 22. The first end 84 includes internal threads 85 that engage the drive shaft threads 68. Referring to FIGS. 5–7, a second end 86 of the connector includes an inner conical surface 88 and a cylindrical bore 90. External threads 92 are defined on the second end 86 of the connector.

Figure 4:
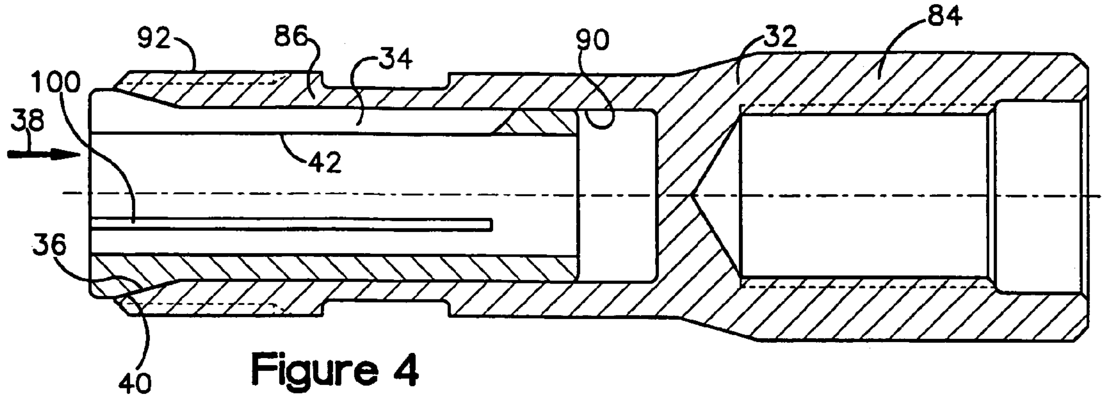
FIG. 4 is a sectional view of a connector assembly.

Referring to FIGS. 8–11, the second clamping member 34 is a collet having a conical exterior surface 94 for engaging the conical interior surface 88 of the connector. A cylindrical shaft 96 extends axially from the from the conical exterior surface 94. The collet includes an axial passage 98 that extends through the collet. The axial passage 98 defines the clamping surface 42. A plurality of slots 100 are disposed through a cylindrical wall 102 defined by the exterior surface of the collet and the axial passage. The slots 100 allow the wall to be pressed radially inward to reduce the diameter of the clamping surface 42. Referring to FIG. 4, when the collet is axially pressed into the connector as indicated by arrow 38, the exterior conical surface of the collet engages the interior conical surface of the connector to reduce the size of the axial passage. Referring to FIG. 2, this causes the collet to clamp down on the pinion gear drive shaft 28. The axial pressing of the collet into the connector also creates an interference fit between the connector and the collet, clamping the collet in the connector.

In the embodiment illustrated in FIG. 2, the collet is axially pressed into the connector by tightening of a nut 104. Referring to FIGS. 12–15, the nut has internal threads 106 that engage the external threads 92 of the connector. The drive shaft 28 extends through a central opening 108 in the nut. The collet is pressed into the connector by an interior surface 110 (FIG. 15) of the nut that surrounds the central opening and butts against a surface of the collet. As the nut is tightened it advances with respect to the connector and pushes the collet into the connector thereby closing the clamping surface 42.

Referring to FIG. 2, the handle assembly 16 with the motor 22 and transmission 12 installed is connected to a knife head assembly 112 to couple the motor 22 to the annular blade 18. The head assembly includes the annular blade 18, the blade housing 20, a blade housing cover plate 21, and a coupling 114.

The annular blade 18 includes the blade edge 24 at a first axial end and the gear teeth 26 formed around a perimeter of a second axial end. Referring to FIG. 2, a circumferential groove 116 is disposed between the blade edge 24 and the gear teeth 26.

Figure 20:
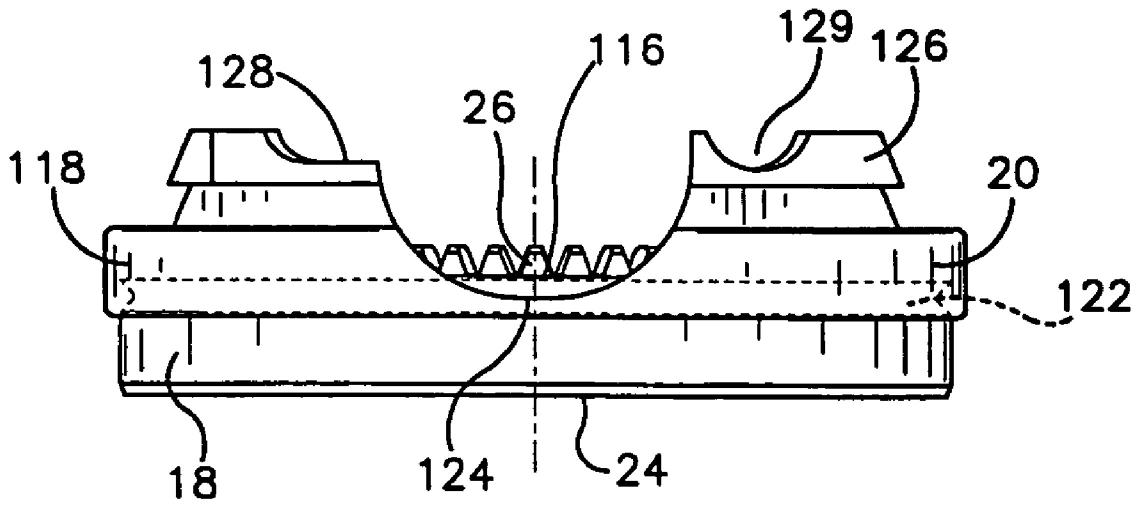
FIG. 20 is an elevational view of an annular blade secured in a blade housing.

Referring to FIG. 20, the blade housing 20 includes a circumferential wall 118 that defines a housing interior. A circumferential ridge 122 extends radially inward from the wall 118. The ridge 122 fits in the groove 116 of the blade 18. The ridge 122 and wall 118 supports the annular blade 18 while allowing the annular blade to rotate with respect to the blade housing 20. A notch 124 in the circumferential wall 118 allows the bearing surface to be expanded outwardly for separating the annular blade 18 from the blade housing 20. Should the ring blade need to be sharpened or replaced, the bearing surface is expanded and the ring blade slips out of the housing through an expanded or widened opening.

The circumferential wall 118 includes a taller portion 126 near the notch 124. The taller wall portion facilitates attachment of the blade housing to the coupling 114. Referring to FIG. 20, the exterior of the taller wall portion 126 includes a groove 128 and a cutout 129.

Figure 19:
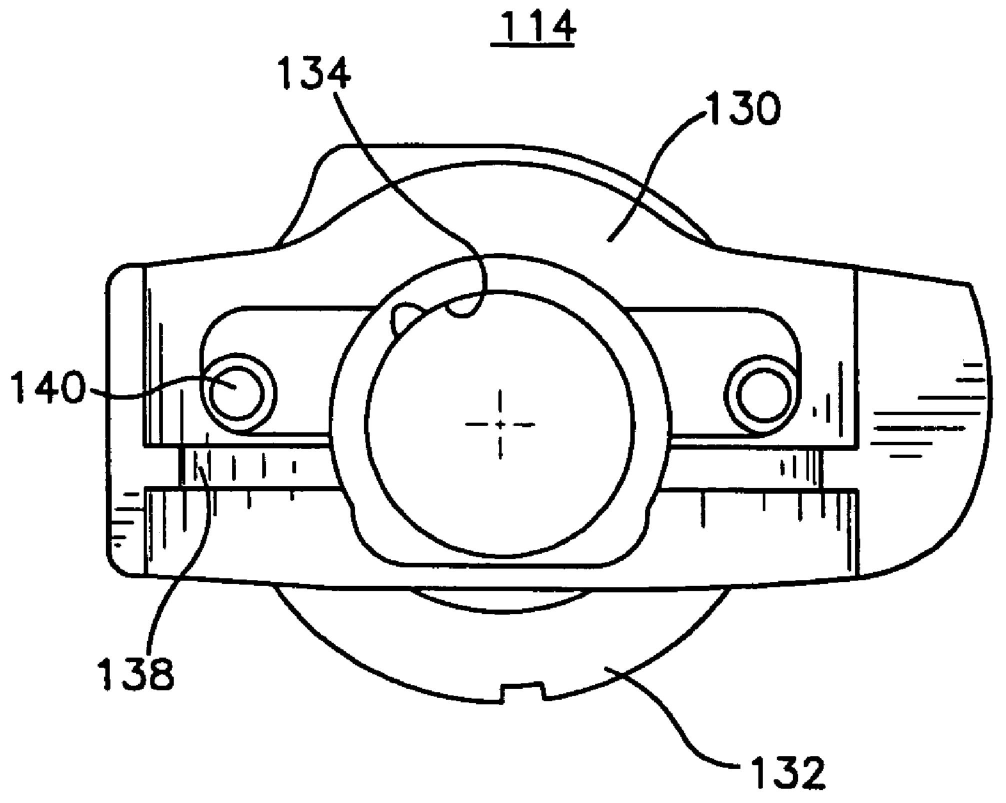
FIG. 19 is an elevational view of a coupling that connects a blade housing to a handle assembly.

Referring to FIGS. 1, 2 and 19, the coupling 114 includes a housing support member 130 and a captive nut 132. The housing support member 130 includes a bore 134 that the transmission 12 extends through. An annular flange 135 (FIG. 2) holds the captive nut 132 on the housing support member, but allows the nut to rotate freely. An arcuate ridge 138 (FIG. 19) extends outwardly from the housing support member 130. The arcuate ridge 138 fits within the blade housing groove 128 (FIG. 20) and limits the blade housing to rotational adjustment with respect to the housing support member 130. A pair of fasteners 140 extend through the housing support member 130 near the ridge 138 on opposite sides of the bore 134.

Figure 16:
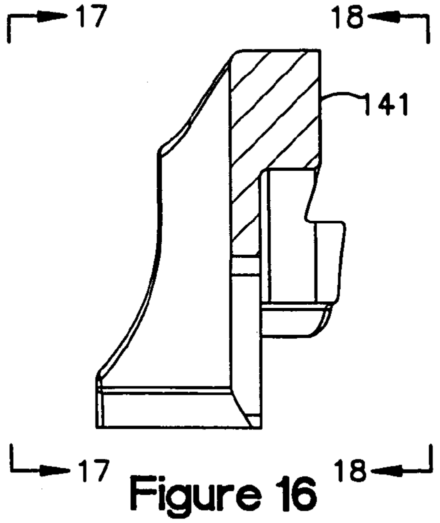
FIG. 16 is an elevational view of a blade housing and cover plate.
Figure 17:
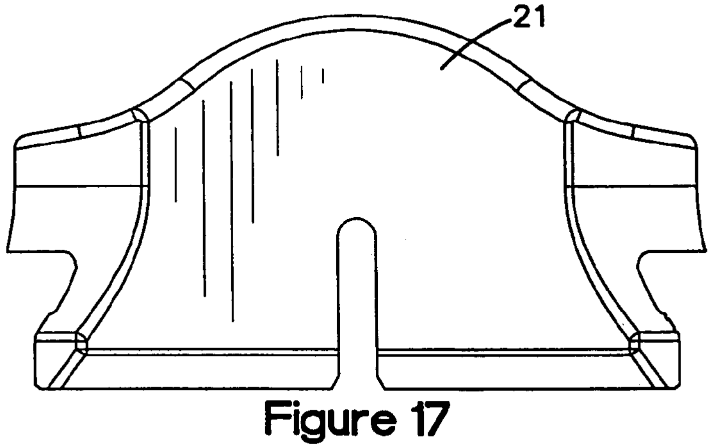
FIG. 17 is a view taken along the plane indicated by lines 17—17 in FIG. 16.
Figure 18:
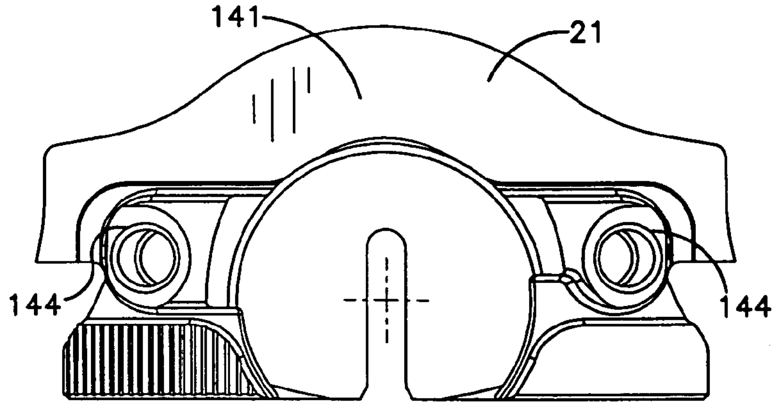
FIG. 18 is a view taken along the plane indicated by lines 18—18 in FIG. 16.

Referring to FIGS. 16–18, the cover plate 21 includes an arcuate surface 141 that mates with the circumferential wall 118. A pair of internally threaded bosses 144 extend outward from the arcuate surface 141. The fasteners 140 in the coupling thread into the bosses 144 to clamp the blade housing 20 against the housing support member 130. One of the bosses 144 extends through the cutout 129 (FIG. 20) to prevent rotational movement of the blade housing 20 with respect to the blade housing support member 130. When the fasteners 140 are tightened, the blade housing 20 is secured to the blade housing support member 130 and the blade 18 freely rotates within the blade housing 20.

Referring to FIG. 2, the retainer 54 secures the pneumatic motor 22 in the handle assembly 16 and secures the handle assembly to the head assembly 112. The retainer 54 includes external threads 146 and an annular bore 148. An annular air seal 150 is positioned in the annular bore 148. A portion of the retainer threads 146 are threaded into the tubular housing internal threads 52 to secure the pneumatic motor in the handle assembly. The connector assembly 30 extends through the seal 150. An inner surface 152 of the air seal is disposed tightly around the connector assembly, but allows free rotational movement of the connector assembly inside the air seal. The air seal 150 inhibits air supplied to the motor 22 from leaking into the head assembly 112 around the connector assembly 30.

A portion of the retainer threads 146 extend from the handle assembly 16. The connector assembly 30 and the drive gear are inserted into the head assembly bore 134 such that the drive gear 12 meshes with the blade gear teeth 26. The connector assembly 30 positions the gear 12, such that the gear does not interfere with the cover plate 21. The captive nut 132 is threaded onto the external threads 146 to secure the handle assembly 16 to the head assembly 112.

The disclosed pneumatic knife blade transmission securely holds the drive gear 12 in place. As a result, air leaks into the front of the pneumatic rotary knife do not force the drive gear into the blade housing cover plate 21.

Although the present invention has been described with a degree of particularity, it is the intent that the invention include all modifications and alterations falling within the spirit or scope of the appended claims.

The invention claimed is:

1. A rotary knife operable from a source of high pressure air, comprising:

a) a tubular handle assembly;

b) an annular blade having a blade edge at a first axial end and gear teeth formed around a perimeter of a second axial end;

c) a blade housing coupled to the tubular handle assembly that supports the annular blade for rotation about a central axis;

d) a pneumatic motor assembly supported by the handle assembly for driving the blade;

e) a connector assembly coupled to the pneumatic motor, the connector assembly including:

i) a first clamping member with an inner surface of axially decreasing extent;

ii) a second clamping member having an exterior surface of axially decreasing extent for engaging the inner surface of said first clamping member and further including a clamping surface, wherein axially pressing the second member into the first clamping member reduces the size of the clamping surface;

f) a drive shaft clamped in the clamping the surface of the connector assembly by axially pressing the second clamping member into the first clamping member; and g) a pinion gear fixed to the drive shaft which meshes with the annular blade gear teeth to drive the annular blade upon rotation by the pneumatic motor assembly.

2. The rotary knife of claim 1 wherein the inner surface of axially decreasing extent is a conical surface.

3. The rotary knife of claim 1 wherein the outer surface of axially decreasing extent is a conical surface.

4. The rotary knife of claim 1 wherein the second clamping member is axially pressed into the first clamping member by tightening of a nut having internal threads that engage external threads of the first clamping member.

5. The rotary knife of claim 4 wherein the drive shaft extends through a central opening in the nut and the second clamping member is pressed into the first clamping member by an interior surface of the nut that surrounds the central opening.

6. A rotary knife operable from a source of high pressure air, comprising:

a) a tubular handle assembly;

b) an annular blade having a blade edge at a first axial end and gear teeth formed around a perimeter of a second axial end;

c) a blade housing coupled to the tubular handle assembly that supports the annular blade for rotation about a central axis;

d) a pneumatic motor assembly supported by the handle assembly for driving the blade;

e) a drive transmission assembly for transmitting drive from the motor to the annular blade, the drive transmission assembly comprising:

i) a connector having a first end coupled an output shaft of the pneumatic motor and a second end with a concavity having an inner surface of axially decreasing extent;

ii) a clamping member having an exterior surface of axially decreasing extent for engaging the inner surface of said connector and further including a clamping surface wherein axially pressing the clamping member into the concavity reduces the size of the inner surface;

iii) a drive shaft clamped against the clamping surface of the clamping member by axially pressing the clamping member into the concavity; and iv) a pinion gear fixed to the drive shaft which meshes with the annular blade gear teeth to drive the annular blade upon rotation by the pneumatic motor assembly.

7. The rotary knife of claim 6 wherein the concavity of axially, decreasing extent is a conical concavity.

8. The rotary knife of claim 6 wherein the clamping member has a conical outer surface.

9. The rotary knife of claim 6 wherein the clamping member is axially pressed into the conical concavity by tightening of a nut having internal threads that engage external threads of the connector second end.

10. The rotary knife of claim 9 wherein the drive shaft extends through a central opening in the nut and the clamping member is pressed into the conical concavity by an interior surface of the nut that surrounds the central opening.

11. A rotary knife operable from a source of high pressure air, comprising:

a) a tubular handle assembly;

b) an annular blade having a blade edge at a first axial end and gear teeth formed around a perimeter of a second axial end;

c) a blade housing coupled to the tubular handle assembly that supports the annular blade for rotation about a central axis;

d) a pneumatic motor assembly supported by the handle assembly for driving the blade;

e) a drive transmission assembly for transmitting drive from the motor to the annular blade, the drive transmission assembly comprising:

i) a connector having a first end connected to an output shaft of the pneumatic motor and a second end with an inner conical surface;

ii) a clamping member having a conical exterior surface for engaging the conical surface and further including a clamping surface, wherein axially pressing the clamping member into the conical concavity reduces the size of the cylindrical inner surface;

iii) a drive shaft clamped in the clamping member by axially pressing the clamping member into the connector; and iv) a pinion gear fixed to the drive shaft, the pinion gear meshes with the annular blade gear teeth to drive the annular blade upon rotation by the pneumatic motor assembly.

12. The rotary knife of claim 11 wherein the clamping member is axially pressed into the connector by tightening of a nut having internal threads that engage external threads of the connector second end.

13. The rotary knife of claim 12 wherein the drive shaft extends through a central opening in the nut and the clamping member is pressed into the conical concavity by an interior surface of the nut that surrounds the central opening.

14. A method of coupling a pinion gear to a rotary knife pneumatic motor, comprising:

a) inserting a drive shaft of the pinion gear into an opening in a clamping member having an exterior surface of axially decreasing extent;

b) inserting the clamping member into a concavity of axially decreasing extent defined in a member that rotates upon actuation of the pneumatic motor;

c) axially pressing the clamping member into the concavity to reduce the size of the opening in the clamping member to cause frictional engagement between the clamping member and the drive shaft to couple the pinion gear to the rotary knife pneumatic motor.

15. A method of coupling a pinion gear to a rotary knife pneumatic motor, comprising:

a) connecting a first end of a connector to a pneumatic motor drive motor;

b) inserting a drive shaft of the pinion gear through an opening in a clamping nut;

c) inserting the drive shaft into an opening in a collet;

d) inserting the collet into a conical opening in the second end of the connector;

e) tightening the clamping nut onto threads on an outer surface of the connector second end to axially press the collet axially into the conical opening to cause frictional engagement between the collet and the drive shaft to couple the pinion gear to the rotary knife pneumatic motor.

* * * * *